United States Patent
Pratt et al.

(10) Patent No.: US 9,997,169 B2
(45) Date of Patent: *Jun. 12, 2018

(54) IMAGE-BASED TECHNIQUES FOR AUDIO CONTENT

(71) Applicants: AT&T INTELLECTUAL PROPERTY I, L.P., Atlanta, GA (US); AT&T MOBILITY II, LLC, Atlanta, GA (US)

(72) Inventors: James H. Pratt, Round Rock, TX (US); Michael Lattanzi, Bothell, WA (US); Steven Belz, Sunnyvale, TX (US); Constance Missimer, Seattle, WA (US)

(73) Assignees: AT&T INTELLECTUAL PROPERTY I, L.P., Atlanta, GA (US); AT&T MOBILITY II LLC, Atlanta, GA (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/254,685

(22) Filed: Sep. 1, 2016

(65) Prior Publication Data

US 2016/0372130 A1 Dec. 22, 2016

Related U.S. Application Data

(63) Continuation of application No. 14/677,682, filed on Apr. 2, 2015, now Pat. No. 9,521,365.

(51) Int. Cl.
*H04N 7/15* (2006.01)
*G10L 21/0208* (2013.01)
(Continued)

(52) U.S. Cl.
CPC .......... *G10L 21/0208* (2013.01); *G10L 21/02* (2013.01); *H04N 7/147* (2013.01)

(58) Field of Classification Search
None
See application file for complete search history.

(56) References Cited

U.S. PATENT DOCUMENTS 6,483,532 B1 11/2002 Girod
6,944,880 B1 9/2005 Allen
(Continued)

FOREIGN PATENT DOCUMENTS

| EP | 1443498 B1 | 3/2008 |
| JP | 2010028281 A | 2/2010 |
| WO | 2002029784 A1 | 4/2002 |

OTHER PUBLICATIONS

Davis, et al., "The Visual Microphone: Passive Recovery of Sound from Video", ACT Transactions on Graphics (TOG), Jul. 2014, vol. 33, Issue 4, 10 pp.

(Continued)

*Primary Examiner* — Creighton Smith
(74) *Attorney, Agent, or Firm* — Toler Law Group, PC

(57) ABSTRACT

A method includes receiving, at a device from a first media device, audio data and image information indicating vibrations of an object. The vibrations are caused by sound in vicinity of the object. The method includes generating audio information based on the image information. The method includes filtering the audio data based on the audio information to generate audio content associated with the first media device. The method further includes transmitting the audio content from the device to a second media device.

20 Claims, 5 Drawing Sheets

(51) Int. Cl.
*H04N 7/14* (2006.01)
*G10L 21/02* (2013.01)

(56) References Cited

U.S. PATENT DOCUMENTS

| | | | |
|---|---|---|---|
| 7,438,315 B2 | 10/2008 | Blackburn | |
| 7,613,532 B2 | 11/2009 | Anderson et al. | |
| 7,684,982 B2 | 3/2010 | Taneda | |
| 7,750,978 B2 | 7/2010 | Zhu | |
| 8,041,026 B1 | 10/2011 | Coughlan et al. | |
| 8,479,237 B1 | 7/2013 | Stark | |
| 8,528,026 B2 | 9/2013 | Pearson | |
| 8,595,777 B2 | 11/2013 | Pearson | |
| 8,687,090 B2 | 4/2014 | Han | |
| 8,856,849 B2 | 10/2014 | Lafreniere et al. | |
| 2003/0005462 A1 | 1/2003 | Broadus et al. | |
| 2005/0220310 A1 | 10/2005 | McGrath | |
| 2009/0169127 A1 | 7/2009 | Lu | |
| 2009/0322745 A1 | 12/2009 | Zhang | |
| 2010/0092003 A1 | 4/2010 | Gygax et al. | |
| 2012/0050570 A1 | 3/2012 | Jasinski et al. | |
| 2012/0109632 A1 | 5/2012 | Sugiura | |
| 2012/0306823 A1* | 12/2012 | Pance | H04R 1/028 345/177 |
| 2014/0091937 A1* | 4/2014 | Pratt | G06F 3/0425 340/670 |
| 2014/0206416 A1 | 7/2014 | Aurongzeb et al. | |
| 2014/0359676 A1 | 12/2014 | Diab et al. | |
| 2015/0070516 A1 | 3/2015 | Shoemake et al. | |
| 2015/0195644 A1* | 7/2015 | Wilson | H04R 1/40 381/92 |
| 2015/0249859 A1* | 9/2015 | Hartley | H04N 21/4363 375/240.02 |
| 2015/0319540 A1* | 11/2015 | Rubinstein | H04R 23/008 381/172 |

OTHER PUBLICATIONS

Telschow, K., "Laser Acoustic Imaging of Film Bulk Acoustic Resonator (FBAR) Lateral Mode Dispersion"—Abstract Only, Review of Progress in Quantitative Nondestructive Evaluation, vol. 24, Apr. 2005, 2 pages.

Claburn, Thomas, "Eavesdropping on a New Level", Information Week—Connecting the Business Technology Community, Aug. 5, 2014, 3 pp.

Hardesty, L., "Extracting Audio from Visual Information", MIT News Office, Aug. 4, 2014, 4 pages.

Gazziro, M. et al., "Multi-Modal Acoustic Echo Canceller for Video Conferencing Systems", https://www.academia.edu/, Aug. 2012, 7 pages.

* cited by examiner

US 9,997,169 B2

IMAGE-BASED TECHNIQUES FOR AUDIO CONTENT

PRIORITY CLAIM

This application claims priority from, and is a continuation of, U.S. patent application Ser. No. 14/677,682, filed on Apr. 2, 2015, which is incorporated herein by reference in its entirety.

FIELD OF THE DISCLOSURE

The present disclosure is generally related to electronic devices and more particularly to the use of image-based techniques for audio content by electronic devices.

BACKGROUND

Electronic devices may use networks to communicate audio information (e.g., audio files representing recorded speech) to users. As an example, users of electronic devices may use video meetings (e.g., video chats and video teleconferences) to communicate with other users.

In a video meeting, a first participant may use an image sensor (e.g., a camera) to capture video content and may also use an acoustic sensor (e.g., a microphone) to capture audio content. The video content and the audio content may be transmitted over a network and provided to an electronic device of a second participant (e.g., a display device and a speaker). Similarly, the second participant may communicate video content and audio content to the first participant.

In some circumstances, quality of audio content transmitted during the video meeting may be reduced due to noise or interference. To illustrate, if both participants of the video meeting are viewing a common television program, then the audio content captured by the first participant (e.g., speech) may include a representation of sound from the television program. Once the audio content is transmitted via the network and reproduced for the second participant, a delay between the transmitted sound and the sound generated by the television of the second participant may cause the second participant to perceive an "echo." Further, in some cases, the sound from the television program may "drown out" the speech from the first participant, which may render the audio content unintelligible for the second participant.

DETAILED DESCRIPTION

Figure 1:
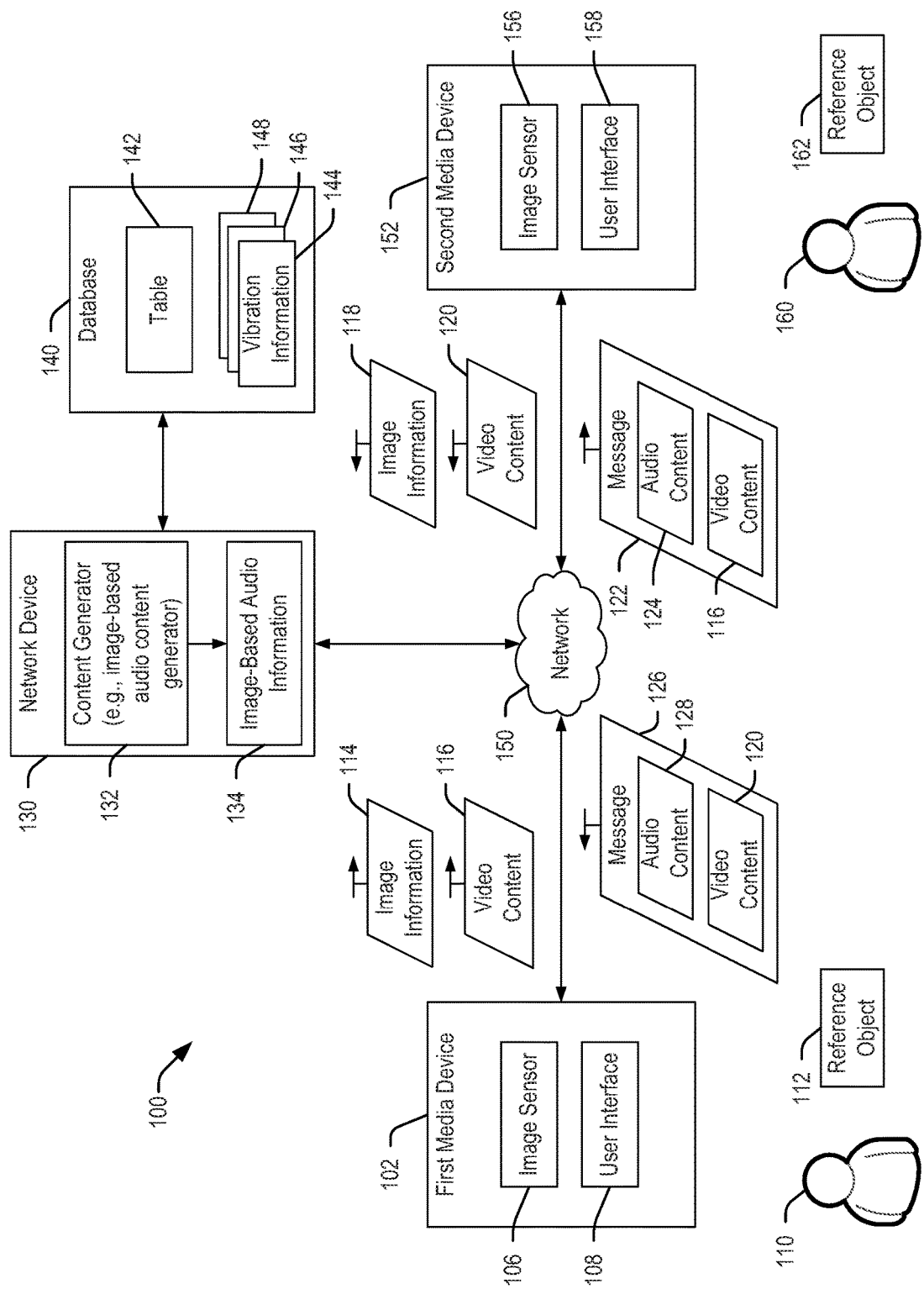
FIG. 1 is a block diagram illustrating a particular example of a system that uses image-based audio content.

A device in accordance with the disclosure may use an image-based technique to record information that can be used to reproduce sound. For example, in some cases, a high definition (HD) video camera may record information that indicates vibrations (or deformations) of an object that are caused by acoustic waves (e.g., speech and/or sound from a media device, such as a television). The information can be used to reproduce the speech (e.g., without recording the speech using a microphone). The image-based technique may be used in connection with any system that records, transmits, and/or reproduces audio information. As an illustrative example, the image-based technique may be used in connection with a video meeting (e.g., a video chat or a video teleconference) that records, transmits, and reproduces audio information.

Recording acoustic information using an image-based technique may enable speech of a first participant of a video meeting to be reproduced for a second participant of the video meeting without noise or other unwanted sound. For example, if the first participant and the second participant are viewing a common television program, then predetermined vibration information corresponding to the sound of the television program may be subtracted (e.g., canceled) from the information recorded by the HD video camera. After subtracting vibration information corresponding to the sound of the television program, the information may be used to reproduce speech of the user that does not include the sound of the television program (thus reducing or preventing perception of an "echo" by the second participant). Further, subtracting the vibration information may remove a "spoiler" from the video chat, such as when a touchdown of a football game is presented sooner to one video meeting participant than to another video meeting participant (e.g., due to network delay, latency, data buffering, or use of a digital video recorder, as illustrative examples).

In a particular example, a method includes receiving, at a device from a first media device associated with a first user, image information indicating vibrations of an object. The vibrations are caused at least in part by speech of the first user. The method further includes generating audio content by the device based on the image information. The audio content represents the speech of the first user. The method further includes transmitting the audio content from the device to a second media device.

In another particular example, an electronic device includes a processor and a memory in communication with the processor. The memory includes instructions executable by the processor to perform operations. The operations include generating audio content based on image information. The image information is received from a first media device associated with a first user, and the image information indicates vibrations of an object. The vibrations are caused at least in part by speech of the first user, and the audio content represents the speech of the first user. The operations further include transmitting the audio content to a second media device.

In another particular example, a computer-readable storage device includes instructions executable by a processor to perform operations. The operations include generating audio content based on image information. The image information is received from a first media device associated with a first user, and the image information indicates vibrations of an object. The vibrations are caused at least in part by speech of the first user, and the audio content represents the speech of the first user. The operations further include transmitting the audio content to a second media device.

Referring to FIG. 1, a particular embodiment of a system is depicted and generally designated 100. The system 100 may include a first media device 102, a network device 130, a database 140, and a second media device 152. Although FIG. 1 illustrates two media devices (the media devices 102, 152) and one network device (the network device 130), it should be appreciated that the system 100 may include a different number of devices (e.g., three or more media devices and two or more network devices). Each of the first media device 102, the network device 130, and the second media device 152 may include one or more processors and one or more memories storing instructions that are executable by the one or more processors.

The first media device 102 may include one or more electronic devices. For example, although the first media device 102 is described as a single device for convenience, it should be appreciated that the first media device 102 may include a set-top box (STB), a customer premises equipment (CPE) device, a television, a monitor, a camera, a microphone, a mobile device (e.g., a cellular telephone), a gaming system, a computer (e.g., a laptop computer, a desktop computer, or a tablet computer), another electronic device, or a combination thereof, as illustrative examples. In an illustrative implementation, the first media device 102 includes an STB and a display (e.g., a television or a monitor).

In the example of FIG. 1, the first media device 102 includes an image sensor 106 (e.g., a camera, a video recorder, a video camera, or a camcorder, such as a high definition (HD) camcorder, or a combination thereof) and a user interface 108 (e.g., a monitor, a television display, a speaker, an input device, or a combination thereof, as illustrative examples). The image sensor 106 may include an optical imaging device (e.g., a charge-coupled device (CCD) or a complementary metal-oxide-semiconductor (CMOS) device), an acoustic imaging device (e.g., an ultrasonic imaging device), or a combination thereof The image sensor 106 and the user interface 108 may be integrated within a single electronic device or may be included in multiple electronic devices, any of which may be communicatively coupled (e.g., via a wired connection, a wireless connection, or an optical connection).

The first media device 102 may be associated with a first user 110. A reference object 112 may be proximate to the first media device 102 and the first user 110. For example, the reference object 112 may be sufficiently proximate to the first user 110 to vibrate in response to speech from the first user 110, and the reference object 112 may be sufficiently proximate to the image sensor 106 to enable the image sensor 106 to capture images of the reference object 112. As an illustrative example, the image sensor 106, the first user 110, and the reference object 112 may be located in a common room.

The second media device 152 may include one or more electronic devices. For example, although the second media device 152 is described as a single device for convenience, it should be appreciated that the second media device 152 may include a STB, a CPE device, a television, a monitor, a camera, a microphone, a mobile device (e.g., a cellular telephone), a gaming system, a computer (e.g., a laptop computer, a desktop computer, or a tablet computer), another electronic device, or a combination thereof, as illustrative examples. In an illustrative implementation, the second media device 152 includes an STB and a display (e.g., a television or a monitor).

In the example of FIG. 1, the second media device 152 includes an image sensor 156 (e.g., a camera, a video recorder, a video camera, or a camcorder, such as an HD camcorder, or a combination thereof) and a user interface 158 (e.g., a monitor, a television display, a speaker, an input device, or a combination thereof, as illustrative examples). The image sensor 156 may include an optical imaging device (e.g., a CCD or a CMOS device), an acoustic imaging device (e.g., an ultrasonic imaging device), or a combination thereof The image sensor 156 and the user interface 158 may be integrated within a single electronic device or may be included in multiple electronic devices, any of which may be communicatively coupled (e.g., via a wired connection, a wireless connection, or an optical connection).

The second media device 152 may be associated with a second user 160. A reference object 162 may be proximate to the second media device 152 and the second user 160. For example, the reference object 162 may be sufficiently proximate to the second user 160 to vibrate in response to speech from the second user 160, and the reference object 162 may be sufficiently proximate to the image sensor 106 to enable the image sensor 106 to capture images of the reference object 162. As an illustrative example, the image sensor 156, the second user 160, and the reference object 162 may be located in a common room.

In some implementations, the network device 130 includes a server, such as a media content server, which may provide content to users (e.g., the users 110, 160). The network device 130 may include a content generator 132, such as an image-based audio content generator. In an illustrative implementation, the content generator 132 includes a processor and a memory in communication with the processor, where the memory stores instructions executable by the processor. The network device 130 may be communicatively coupled to the database 140, such as via a local area network (LAN), a wireless LAN (WLAN), a wide area network (WAN), the Internet, a cellular network, an optical network, a secure network, or another network, as illustrative examples. In some implementations, the database 140 may be included in the network device 130.

FIG. 1 illustrates that the first media device 102, the network device 130, and the second media device 152 may be communicatively coupled via a network 150. For example, the network 150 may include a content distribution network, the Internet, a cellular network, an optical network, another network, or a combination thereof, as illustrative examples. Although the network 150 is described as a single network for convenience, it is noted that the network 150 may include multiple networks.

In operation, any of the first media device 102, the network device 130, and the second media device 152 may communicate using the network 150. In an illustrative example, the first user 110 may initiate a meeting (e.g., a video meeting, such as a video chat or a video conference) with the second user 160 (or vice versa). For example, the first user 110 may send (e.g., using the first media device 102) a meeting invitation, and the second user 160 may receive (e.g., using the second media device 152) the meeting invitation. An example of a video meeting is a picture-in-picture video meeting. For example, during a picture-in-picture meeting, the second user 160 may be presented with images of the first user 110 overlaying media content (e.g., a television program rendered at the user interface 158), and the first user 110 may be presented with images of the second user 160 overlaying the media content (e.g., at the user interface 108).

During the meeting, the users 110, 160 may exchange communications, such as video messages, audio messages, text messages, or one or more other messages, as illustrative examples. In an illustrative example, the meeting is a video meeting in which the users 110, 160 exchange video messages (or video "clips") regarding content rendered at the media devices 102, 152 (which may be supplied by the network device 130). For example, the content may relate to an event, such as a sports event (e.g., a football game), which the users 110, 160 may discuss via the meeting. In this example, the event may be a live event, and the content may be rendered at the media devices 102, 152 concurrently or substantially concurrently (e.g., by streaming the content to the media devices 102, 152). In other cases, the event may be a recorded event. In these cases, the meeting may be conducted "off-line," such as if the first user 110 records video clips that are presented to the second user 160 at a later time (e.g., by recording comments related to a television program or movie that the second user 160 has not yet viewed).

In a particular implementation, initiation of the meeting may "trigger" the image sensor 106 to capture images of the reference object 112. For example, the reference object 112 may be positioned at a location that is "known" to the image sensor 106, and the image sensor 106 may capture images of the reference object 112 (e.g., upon initiation of the meeting). In some cases, the reference object 112 may include a communication device, such as a near field communication (NFC) device, which may provide a signal to enable the image sensor 106 to locate the reference object 112. As used herein, the reference object 112 may include any object that is capable of vibrating (e.g., experiencing deformation or perturbations) in response to speech by the first user 110 such that the vibrations may be detected by a sensor, such as the image sensor 106.

During the meeting, the first user 110 may provide comments (e.g., comments related to content rendered at the first media device 102) in the form of speech. The reference object 112 may vibrate in response to the speech, and the image sensor 106 may capture image information 114 of the reference object 112 while the reference object 112 is vibrating. For example, the image information 114 may include video frames captured using a video recorder, such as an HD video stream of images of the reference object 112 captured while the first user 110 is speaking.

The image sensor 106 may be configured to capture images of the reference object 112 using a passive imaging process, an active imaging process, or a combination thereof. To illustrate, the image sensor 106 may be configured to capture images using a passive imaging process using ambient light (e.g., sunlight or room lighting). In some cases, ambient light may be insufficient to capture images of the reference object 112. As an illustrative example, if the first user 110 views a television program in the dark, then ambient light may be insufficient to capture images of the reference object 112. The image sensor 106 may be configured to capture images using an active imaging process, such as by directing electromagnetic signals (e.g., infrared (IR) signals) or acoustic signals (e.g., ultrasonic signals) to the reference object 112 and by detecting reflections of the electromagnetic signals or acoustic signals. In an illustrative implementation, the image sensor 106 includes a device (e.g., a photodiode) configured to generate a signal that indicates a degree of ambient light. If the signal fails to satisfy a threshold (e.g., if a current magnitude of the signal fails to satisfy a magnitude threshold), the image sensor 106 may cease use of a passive imaging process and may initiate use of an active imaging process. If the signal satisfies the threshold (e.g., in response to activation of room lighting), the image sensor 106 may cease use of an active imaging process and may initiate use of a passive imaging process (e.g., to conserve power).

In some cases, the meeting between the users 110, 160 is a video meeting. In this case, the image sensor 106 may record video content 116 (e.g., a video stream) of the first user 110 while the first user 110 is speaking (and while the image sensor 106 is generating the image information 114). In this example, the image sensor 106 may include multiple image sensors. It should be appreciated that the example of a video meeting is illustrative and that other examples may not include the video content 116 (e.g., in the case of an audio meeting between the users 110, 160).

In the example of FIG. 1, the first media device 102 may send the image information 114 and the video content 116 to the network device 130 via the network 150. The network device 130 may be configured to generate (or "extract") image-based audio information 134 using the image information 114. For example, the content generator 132 may be configured to detect vibration information indicated by the image information 114, such as by performing image processing operations to detect vibrations of the reference object 112. In this example, the image-based audio information 134 may indicate amplitude of the vibrations, phase of the vibrations, frequency of the vibrations, or a combination thereof.

In certain cases, the image-based audio information 134 may be affected by sound other than speech of the first user 110. For example, if the first user 110 is watching a television program at the first media device 102, sound associated with the television program may affect vibrations of the reference object 112. In some implementations, the database 140 stores sets of vibration information (e.g., vibration information 144, 146, and 148, or audio information related to the vibration information 144, 146, and 148), and the content generator 132 is configured to access the database 140 and to select particular vibration information in order to filter (e.g., subtract or "cancel") the particular vibration information from the image-based audio information 134. In this example, the vibrations of the reference object 112 are further caused by the sound associated with media content rendered at the first media device 102, and the particular vibration information (e.g., the vibration information 144, 146, or 148) represents the sound associated with the media content.

To illustrate, in one example, the vibration information 144 indicates vibration information associated with sound of a first content item (e.g., a first television program), the vibration information 146 indicates vibration information associated with sound of a second content item (e.g., a second television program), and the vibration information 148 indicates vibration information associated with sound of a third content item (e.g., a third television program). If the first content item is rendered at the first media device 102 when the image information 114 is captured by the image sensor 106, the content generator 132 may select the vibration information 144 and to "cancel" (or compensate for) the vibration information 144 from the image-based audio information 134. For example, the first media device 102 may send an indication of content rendered at the first media device (i.e., the first content item in this example) and timestamps to indicate a time interval during which the image information 114 is captured by the image sensor 106. The content generator 132 may be configured to select a particular portion of the vibration information 144 corresponding to the time interval and to filter (e.g., subtract or "cancel") the particular portion from the image-based audio information 134. In some implementations, the content generator 132 may be configured to convert the image information 114 to an audio representation (e.g., a digital audio file, such as a digital audio bitstream) to generate the image-based audio information 134 and to cancel an audio representation of the vibration information 144 from the image-based audio information 134.

Alternatively or in addition, the content generator 132 may be configured to utilize one or more device attributes of the first media device 102 based on a table 142 (e.g., a lookup table or an index). As an illustrative example, the first media device 102 may provide an indication of a device type of the first media device 102 (e.g., an image sensor type of the image sensor 106 or an imaging process type used by the image sensor 106) or an environment context associated with the first media device 102 (e.g., a size, material, or acoustic property of a room in which the first media device 102, the first user 110, and the reference object 112 are located). In this example, the table 142 may map device attributes (e.g., device type and environment context) to certain acoustic properties. Because the device type and the environment context may affect the image-based audio information 134 (e.g., by affecting amplitude, phase, or frequency of the vibrations of the reference object 112), the content generator 132 may modify the image-based audio information 134 based on the one or more device attributes to compensate for effects of the device type and the environment context. To illustrate, in a large room, reverberation may affect vibrations of the reference object 112 more as compared to a smaller room. The table 142 may indicate that for a larger room, the image-based audio information 134 is to be modified to compensate for the reverberation.

In a particular implementation, the table 142 stores a profile associated with the first user 110. For example, during a setup process, the first media device 102 may generate a reference sound (e.g., using the user interface 108) having a particular frequency, amplitude, and phase. While the reference sound is generated, the image sensor 106 may capture images indicating vibrations of the reference object 112. By analyzing deviation of the vibrations from "expected" vibrations of the reference object 112, the first media device 102 or the network device 130 may determine an environment context associated with the reference object 112 (e.g., an amount of reverberation, an amount of phase delay, an amount of amplitude attenuation, an amount of harmonic distortion, or one or more other parameters, as illustrative examples). The environment context information may be stored in the table 142 and associated with the first user 110. In some implementations, the setup procedure may include a "scan" to identify a reference object, such as the reference object 112 (e.g., by emitting "pings" to identify the reference object 112). It is noted that a setup process may be performed one time, periodically, occasionally, or continuously.

The content generator 132 may be configured to generate audio content 124 based on the image-based audio information 134 (or based on the portion of the image-based audio information 134 remaining after filtering vibration information from the image-based audio information 134). The audio content 124 may represent speech of the first user 110 (e.g., phase of the speech, amplitude of the speech, and/or frequency of the speech). In some implementations, the content generator 132 may include an encoder or a coder/decoder (CODEC) configured to transform the image-based audio information 134 into a file having a particular audio file format. In an illustrative example, in connection with a video meeting between the users 110, 160, the content generator 132 is configured to encode the video content 116 and the audio content 124 into a message 122 (e.g., a video stream or a packet of a video stream) and to send the message 122 to the second media device 152.

In some implementations, certain components and operations of the second media device 152 may be as described with reference to components and operations of the first media device 102. For example, the image sensor 156 may capture image information 118 associated with the reference object 162 while the second user 160 is speaking. In connection with a video meeting, the image sensor 156 (or another image sensor) may also record video content 120. The second media device 152 may provide the image information 118 and the video content 120 to the network device 130.

The network device 130 may generate audio content 128 based on vibrations indicated by the image information 118. For example, the content generator 132 may detect phase of the vibrations, amplitude of the vibrations, frequency of the vibrations, or a combination thereof. The audio content 128 may represent speech of the second user 160 (e.g., phase of the speech, amplitude of the speech, and frequency of the speech). In some implementations, the content generator 132 may cancel any of the vibration information 144, 146, and 148 from the vibrations indicated by the image information 118. In an illustrative implementation, the content generator 132 is configured to encode the audio content 128 and the video content 120 into a message 126, such as a video stream or a packet of a video stream in connection with a video meeting.

The example of FIG. 1 illustrates that an image-based process may be used to generate audio content. The image-based process may be utilized in cases where microphone-based sound recording is infeasible or would result in artifacts (e.g., an "echo" of a television program that may be perceived by a participant of a meeting).

It should be appreciated that the examples of FIG. 1 are illustrative and that modifications of the examples are within the scope of the disclosure. For example, in some implementations, one or more features and operations described with reference to the network device 130 may be implemented at a media device, such as a CPE device. To illustrate, one or more of the media devices 102, 152 may include a content generator corresponding to the content generator 132 and/or a database corresponding to the database 140. In this example, operations described with reference to the content generator 132 and/or the database 140 may be performed at one or more of the media devices 102, 152. In these examples, the messages 122, 126 may be communicated between the media devices 102, 152 without use of the network device 130.

In some implementations, one or both of the media devices 102, 152 may include an audio sensor (e.g., a microphone) configured to record sound using an acoustic-based process. During communication, one or both of the media devices 102, 152 may use either an image-based process or an acoustic-based process as a default and may switch to the other of the image-based process or the acoustic-based process if signal quality fails to satisfy a threshold (e.g., in case of loud noises during an acoustic-based process, or in case of poor image quality during an image-based process). Thus, the techniques of FIG. 1 may be utilized to increase sound quality (e.g., by selectively using either an image-based process or an acoustic-based process).

It is also noted that the examples of FIG. 1 can be implemented using more than or fewer than two media devices. For example, a meeting may involve three or more media devices. In an illustrative example, operations described with reference to the network device 130 may be performed by a third media device that is in communication with the media devices 102, 152.

In another example, operations described with reference to FIG. 1 may involve a single media device and/or a single user. To illustrate, in some cases, the first media device 102 may send image information to the network device 130, and the network device 130 may send audio content to the first media device 102 based on the audio content. This technique may be advantageous in certain environments in which audio is difficult to discern. For example, in a loud sports bar with multiple televisions, the techniques of FIG. 1 may enable reconstruction of the sound of a particular television, which can be replayed to a patron (e.g., via headphones). As another example, the techniques of FIG. 1 assist a user who had muted his or her television to recover "lost" sound, or to assist a user who is hearing impaired. To further illustrate, instead of sending the message 122 to the second media device 152 as described with reference to FIG. 1, the network device 130 may send the message 122 to the first media device 102 (e.g., to enable the first user 110 to "recover" sound generated at the first media device 102). In another example, the second media device 152 is associated with the first user 110, and the network device 130 sends the message 122 to the first user 110 via the second media device 152. As an illustrative example, the second media device 152 may include a hearing assistance device (e.g., a headset) to enable the first user 110 to hear sound generated at the first media device 102 (e.g., a television in a loud sports bar, as an illustrative example).

Figure 2:
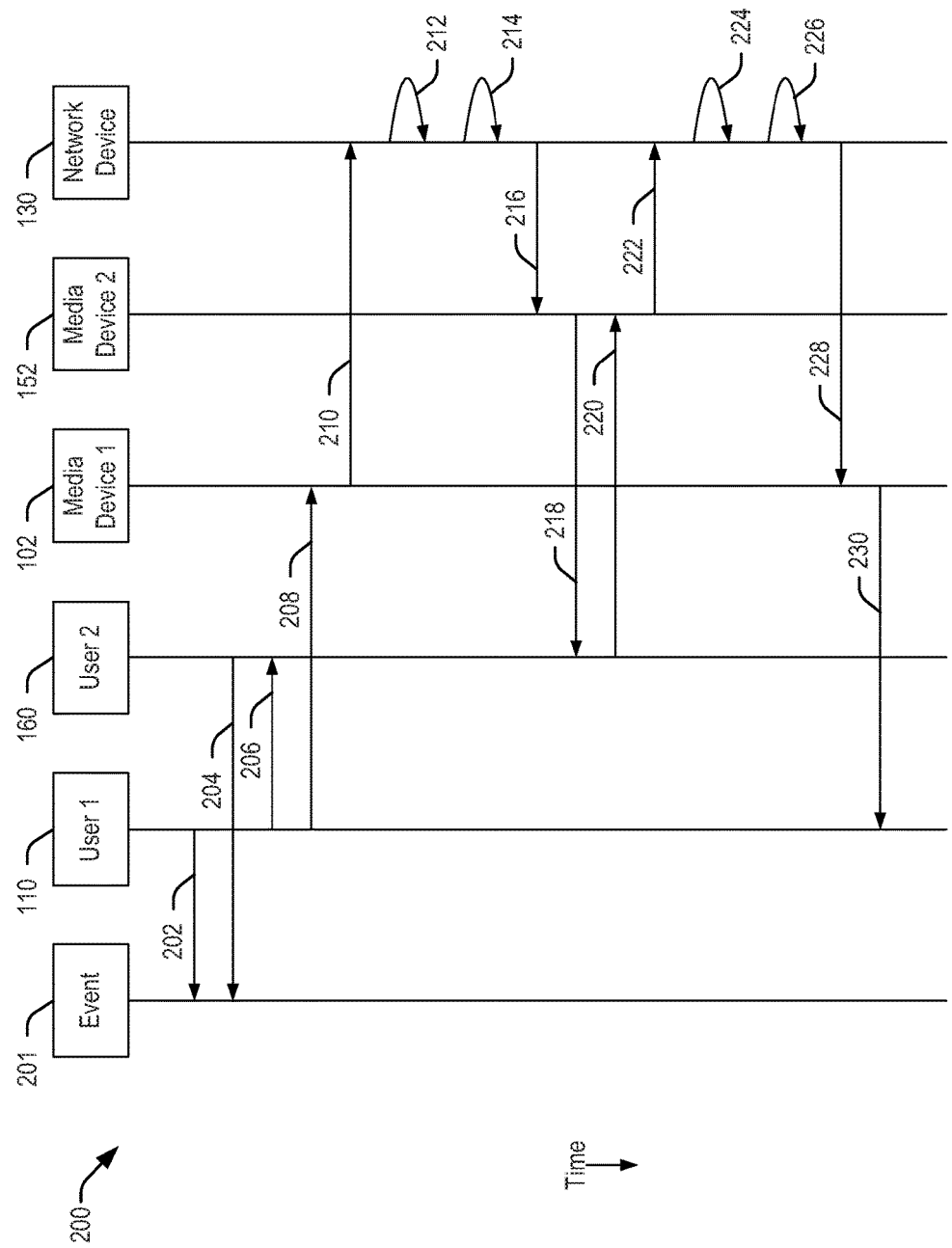
FIG. 2 is a ladder diagram illustrating a particular example of operation of a system, such as the system of FIG. 1.

FIG. 2 is a ladder diagram that illustrates certain operations 200 that may be performed in accordance with the disclosure. The operations 200 may be based on an event 201 (e.g., a sports event, such as a football game) and may involve the first user 110, the second user 160, the first media device 102, the second media device 152, and the network device 130 of FIG. 1.

The operations 200 may include rendering information related to the event 201, at 202, such as by displaying a television program (e.g., a football game) to a first user (e.g., the first user 110). The operations 200 may further include rendering the information (e.g., displaying the television program) to a second user (e.g., the second user 160), at 204. In the example of FIG. 2, the event 201 may be displayed to the first user and the second user at different times (e.g., due to network delay, latency, data buffering, or use of a digital video recorder, as illustrative examples). In other cases, the event 201 may be displayed concurrently or substantially concurrently to the first user and the second user.

A video meeting may be initiated by the first user (e.g., to discuss the television program with the second user), at 206. In a particular example, to facilitate the video meeting, one or more video cameras (e.g., an HD camcorder, which may correspond to the image sensor 106) are used to record first video content (e.g., images of the first user, such as a video stream, which may correspond to the video content 116). The one or more video cameras may also capture first image information (e.g., the image information 114) related to vibrations of an object (e.g., the reference object 112) caused by speech of the first user (and other acoustic signals, such as sound of the television program), at 208. The first image information may include video representations of amplitude, phase, and/or frequency of vibrations in the object caused by acoustic signals.

The operations 200 may also include transmitting, by a first media device (e.g., the first media device 102) associated with the first user, the first video content and the first image information to a network device (e.g., the network device 130), at 210. The network device may subtract vibration information (e.g., any of the vibration information 144, 146, and 148) corresponding to sound of the television program from the first image information to recreate the speech of the first user, at 212. To illustrate, in a particular embodiment, the television program may be played (prior to broadcasting the television program to users), and vibration information associated with the television program (e.g., amplitude, phase, and/or frequency of vibrations in an object caused by sound of the television program) may be recorded and stored in a database (e.g., the database 140). In this example, the database may be accessed to retrieve the vibration information, and the vibration information associated with the television program may be subtracted (or canceled) from the first image information, such as by subtracting the amplitude, phase, and/or frequency of vibrations caused by the sound of the television program from the first image information.

After subtracting the vibration information associated with the television program from the first image information, the network device may generate first audio content, at 214. The first audio content may be encoded (e.g., into a message, such as the message 122) with the first video content associated with the first user. The message may be transmitted to a second media device (e.g., the second media device 152) associated with the second user (e.g., via the network 150), at 216. The first audio content and the first video content may be presented to the second user (e.g., via a television that displays the television program, such as using a picture-in-picture technique), at 218.

The second user may utilize one or more video recorders (which may include the image sensor 156) to record second video content (e.g., images of the second user, such as the video content 120) and second image information (e.g., the image information 118) related to vibrations of an object (e.g., the reference object 162) caused by speech of the second user (and other acoustic signals, such as sound of the television program), at 220. Examples of second image information may include video representations of amplitude, phase, and/or frequency of vibrations in the object caused by acoustic signals.

The second media device may be connected to the network, and the second media device may transmit the second video content and the second image information to the network device, at 222. The network device may subtract vibration information (e.g., any of the vibration information 144, 146, and 148) corresponding to sound of the television program from the second image information to recreate the speech of the second user, at 224. The vibration information associated with the television program (e.g., amplitude, phase, and/or frequency of vibrations in an object caused by sound of the television program) may be retrieved from the database.

After subtracting the vibration information associated with the television program from the second image information, the network device may generate audio content that is encoded into a message (e.g., the message 126) with the second video content, at 226. The audio content and the second video content may be transmitted to the first media device (e.g., via the network 150), at 228. The audio content and the second video content may be presented to the first user (e.g., via a television that is displaying the television program, such as using a picture-in-picture technique), at 230.

The example of FIG. 2 illustrates an image-based audio generation process. In an illustrative embodiment, the image-based audio generation process may enable users to communicate during a television program without perceiving an "echo" resulting from recording speech during viewing of the television program.

Figure 3:
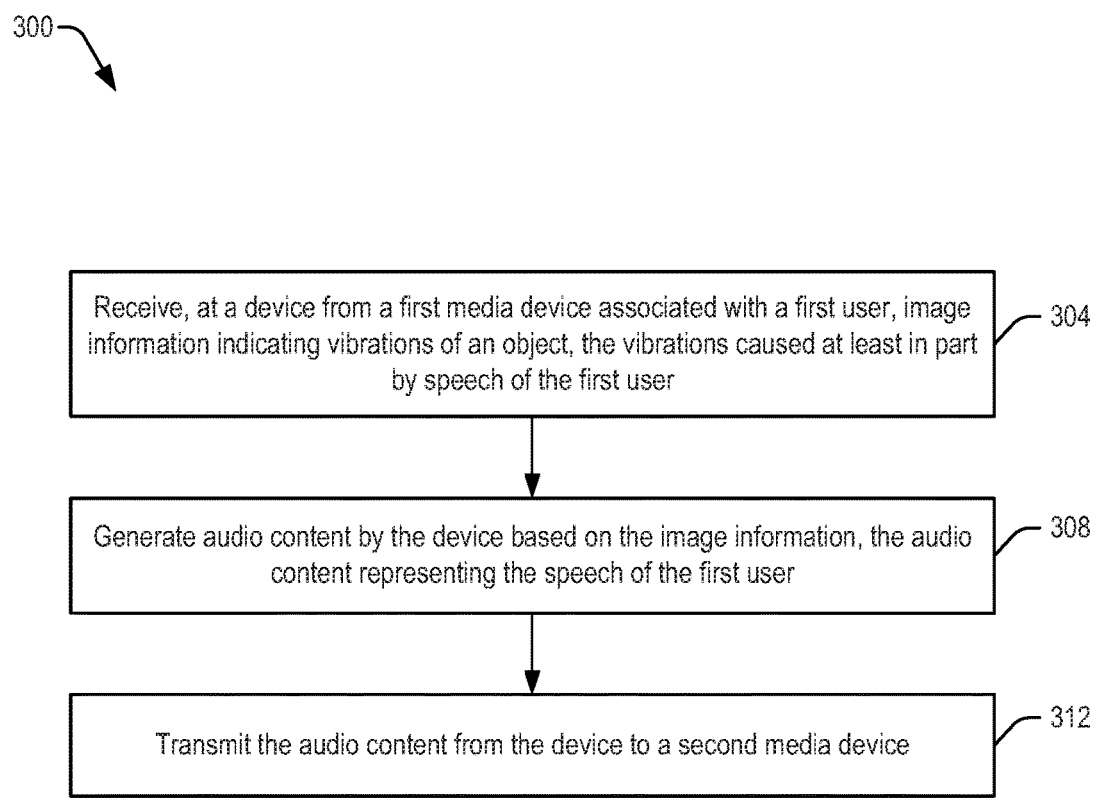
FIG. 3 is a flow diagram that illustrates a particular example of a method of operation of a network device, such as a network device included in the system of FIG. 1.

Referring to FIG. 3, a particular illustrative example of a method is depicted and generally designated 300. The method 300 may be performed at a device. In some implementations, the device may include a network device, such as the network device 130 of FIG. 1, the network device described with reference to FIG. 2, or a combination thereof. Alternatively or in addition, operations of the method 300 may be performed at another device, such as at a CPE device. In some implementations, the method 300 may be performed at a third media device that is in communication with the media devices 102, 152.

The method 300 includes receiving, at the device from a first media device associated with a first user, image information indicating vibrations of an object, at 304. The vibrations are caused at least in part by speech of the first user. To illustrate, the image information may correspond to the image information 114. As additional examples, the first user may correspond to the first user 110, and the object may correspond to the reference object 112.

The method 300 further includes generating audio content by the device based on the image information, at 308. The audio content represents the speech of the first user. To illustrate, the audio content may correspond to the audio content 124 and may be generated by the content generator 132.

The method 300 may further include transmitting the audio content from the device to a second media device, at 312. For example, the second media device may correspond to the second media device 152, and the second user may correspond to the second user 160. In another example, the second media device may be associated with the first user 110.

Figure 4:
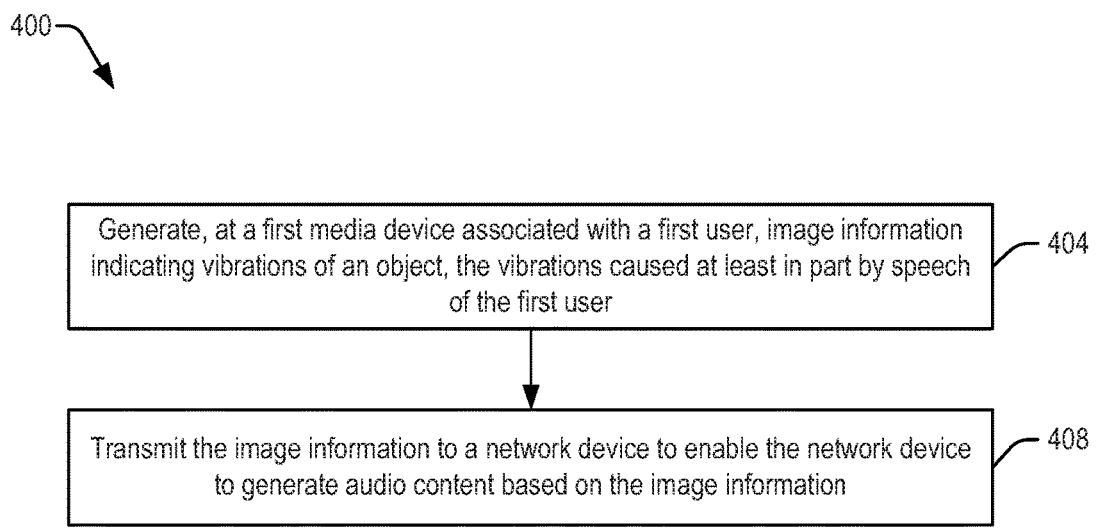
FIG. 4 is a flow diagram that illustrates a particular example of a method of operation of a media device, such as a media device included in the system of FIG. 1.

Referring to FIG. 4, a particular illustrative example of a method is depicted and generally designated 400. The method 400 may be performed by a media device, such as the first media device 102 of FIG. 1, the first media device described with reference to FIG. 2, or a combination thereof.

The method 400 includes generating, at a first media device associated with a first user, image information indicating vibrations of an object, at 404. The vibrations are caused at least in part by speech of the first user. For example, the first user may correspond to the first user 110, and the first media device may correspond to the first media device 102. As additional examples, the image information may correspond to the image information 114, and the object may correspond to the reference object 112.

The method 400 further includes transmitting the image information to a network device to enable the network device to generate audio content based on the image information, at 408. For example, the network device may correspond to the network device 130, and the audio content may correspond to the audio content 124.

Figure 5:
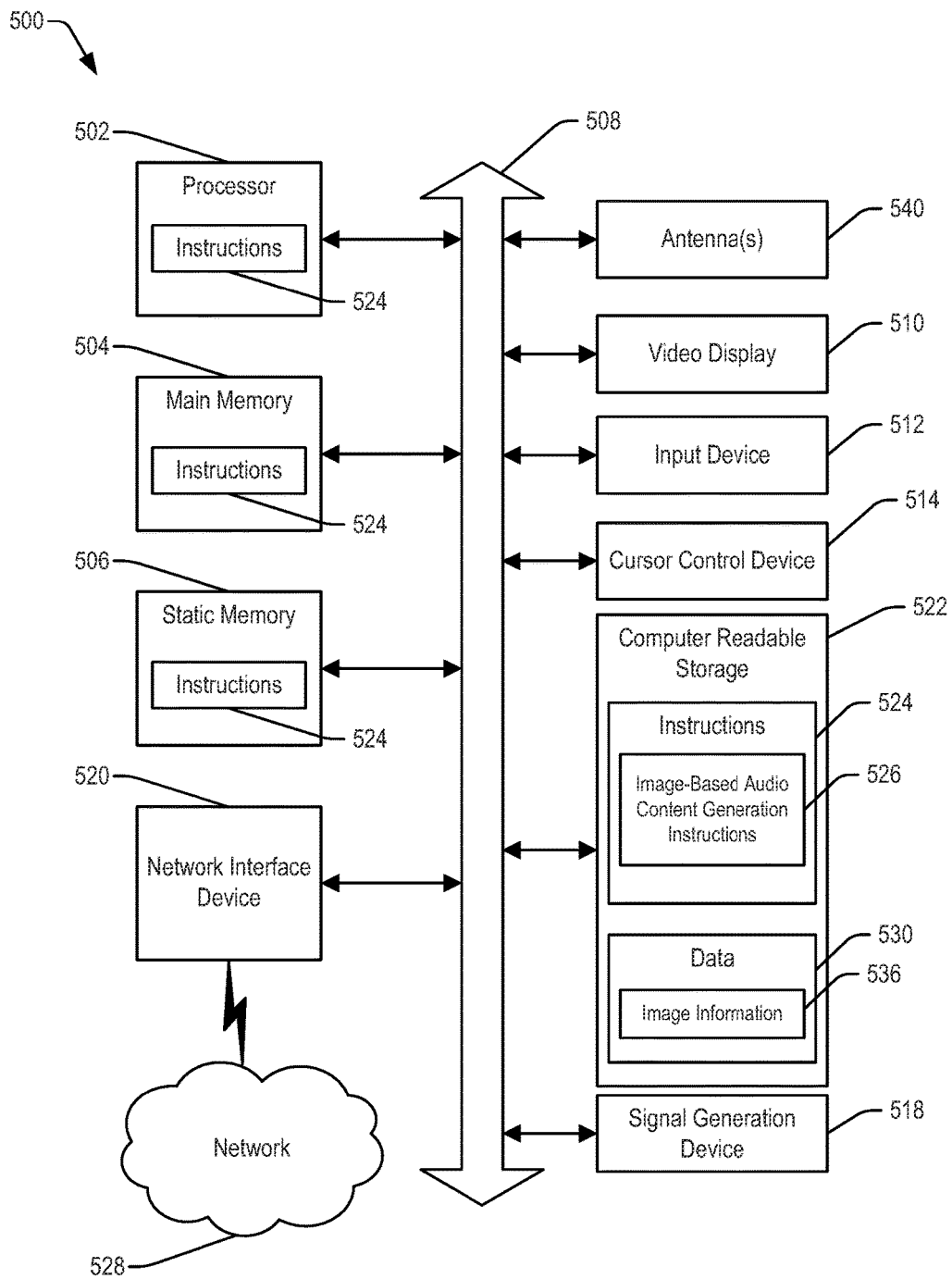
FIG. 5 is a block diagram of an illustrative embodiment of a general computer system that uses image-based audio content.

Referring to FIG. 5, an illustrative embodiment of a general computer system is shown and is designated 500. The computer system 500 includes a set of instructions that can be executed to cause the computer system 500 to perform any one or more of the methods or computer based functions disclosed herein. The computer system 500 may operate as a standalone device or may be connected, e.g., using a network, to other computer systems or peripheral devices. For example, one or more components of the computer system 500 may include or be included within any one or more of the first media device 102, the network device 130, the second media device 152, or a combination thereof.

In a networked deployment, the computer system 500 may operate in the capacity of a server or as a client user computer in a server-client user network environment, or as a peer computer system in a peer-to-peer (or distributed) network environment. The computer system 500 may also be implemented as or incorporated into various devices, such as a mobile device, a palmtop computer, a laptop computer, a desktop computer, a communications device, a wireless telephone, a personal computer (PC), a tablet PC, a personal digital assistant (PDA), an endpoint device, a web appliance, or any other machine capable of executing a set of instructions (sequential or otherwise) that specify actions to be taken by that machine. In a particular embodiment, the computer system 500 may be implemented using electronic devices that provide video, audio, or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. For example, when the computer system 500 corresponds to a media device, the processor 502 may include or correspond to a processor of the first media device 102, the second media device 152, or a combination thereof. As another example, when the computer system 500 corresponds to a network device (e.g., a server), the processor 502 may include or correspond to processor(s) of the network device 130. Moreover, the computer system 500 may include a main memory 504 and a static memory 506, which can communicate with each other via a bus 508. For example, when the computer system 500 corresponds to a media device, the main memory 504 may include or correspond to the first media device 102, the second media device 152, or a combination thereof As another example, when the computer system 500 corresponds to a server, the main memory 504 may include or correspond to a memory of the network device 130. As shown, the computer system 500 may further include a video display unit 510, such as a liquid crystal display (LCD), a light emitting diode (LED) display, a touch screen display, a flat panel display, or a solid state display. Additionally, the computer system 500 may include an input device 512, such as a remote control device or a keyboard, and a cursor control device 514, such as a mouse. In some embodiments, the input device 512 and the cursor control device 514 may be integrated into a single device, such as a capacitive touch screen input device. The computer system 500 may also include a signal generation device 518, such as a speaker, and a network interface device 520. Some computer systems 500 may not include certain components depicted in FIG. 5, such as an input device (e.g., a server may not include an input device). To illustrate, when the computer system 500 corresponds to the network device 130, the computer system 500 may not include an input device.

The computer system 500 may correspond to a mobile device that includes one or more antennae, such as an antenna 540. In other cases, the computer system 500 may be a wired device (e.g., a server) that does not include an antenna.

In a particular embodiment, as depicted in FIG. 5, the computer system 500 may include computer-readable storage 522 in which one or more sets of instructions 524, e.g. software, can be embedded. The computer-readable storage 522 may be random access memory (RAM), read-only memory (ROM), programmable read-only memory (PROM), erasable PROM (EPROM), electrically erasable PROM (EEPROM), register(s), solid-state memory, hard disk, a removable disk, a compact disc read-only memory (CD-ROM), other optical disk storage, magnetic disk storage, magnetic storage devices, or any other storage device that can be used to store program code in the form of instructions or data and that can be accessed by a computer and/or a processor. Computer-readable storage is not a signal. Further, the instructions 524 may embody one or more of the methods or logic as described herein.

When the computer system 500 corresponds to a network device, FIG. 5 illustrates that the instructions 524 may include video-based audio content generation instructions 526. The instructions 524 may be executable by the processor 502 to perform one or more functions or methods described herein, such as one or more of the operations 200 of FIG. 2 or one or more operations of the method 300 of FIG. 3. In this case, the instructions 524 may be executable by the processor 502 to perform operations described with reference to the content generator 132 of FIG. 1. In an alternative embodiment, components of the computer system 500 are integrated within the media devices 102, 152, and the instructions 524 are executable by the processor 502 to perform operations described with reference to the media devices 102, 152 and/or the method 400 of FIG. 4.

In a particular embodiment, the instructions 524 may reside completely, or at least partially, within the main memory 504, the static memory 506, and/or within the processor 502 during execution by the computer system 500. The main memory 504 and the processor 502 also may include a computer-readable storage device. FIG. 5 also illustrates that the computer-readable storage 522 may include data 530. For example, the data 530 may include image information 536 (e.g., the image information 114 of FIG. 1).

In an alternative embodiment, dedicated hardware implementations, such as application specific integrated circuits, programmable logic arrays and other hardware devices, may be constructed to implement one or more of the methods described herein. Various embodiments may include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an exemplary, non-limiting embodiment, implementations may include distributed processing, component/object distributed processing, and parallel processing. Alternatively, virtual computer system processing may be constructed to implement one or more of the methods or functionality as described herein. It is further noted that a computing device, such as a processor, a controller, a state machine or other suitable device for executing instructions to perform operations may perform such operations directly or indirectly by way of one or more intermediate devices directed by the computing device.

The present disclosure includes computer-readable storage 522 that stores instructions 524, so that a device connected to a network 528 (e.g., the network 150) may communicate voice, video or data over the network 528. While the computer-readable storage 522 is shown to be a single device, the computer-readable storage 522 may include a single device or multiple devices, such as a centralized or distributed database, and/or associated caches and servers that store one or more sets of instructions. The computer-readable storage 522 is capable of storing a set of instructions for execution by a processor to cause a computer system to perform any one or more of the methods or operations disclosed herein. For example, the computer-readable storage 522 may store instructions for execution by a processor to cause a computer system to perform one or more of the operations 200 of FIG. 2, one or more operations of the method 300 of FIG. 3 or one or more operations of the method 400 of FIG. 4.

In a particular non-limiting, exemplary embodiment, the computer-readable storage 522 may include a solid-state memory such as embedded memory (or a memory card or other package that houses one or more non-volatile read-only memories). Further, the computer-readable storage 522 may be a random access memory or other volatile re-writable memory. Additionally, the computer-readable storage 522 may include a magneto-optical or optical device, such as a disk or tapes or other storage device. Accordingly, the disclosure is considered to include any one or more of a computer-readable storage device and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for device detection, short-range communications, and long-range communications can be used by the computer system 500 in selected embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines (e.g., virtual servers), components such as microprocessors and storage devices may be virtualized or logically represented. The processor can include a state machine, an application specific integrated circuit, and/or a programmable gate array (PGA) including a FPGA. In one or more embodiments, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving, at a device from a first media device, audio data and a video of an object;
   determining vibrations of the object from the video, the vibrations caused by sound in a vicinity of the object, wherein a portion of the vibrations is responsive to media content rendered at the first media device;
   accessing a database to retrieve vibration data associated with the media content rendered at the first media device;
   filtering the vibration data from the portion to generate vibration information;
   generating audio information based on the vibration information;
   filtering the audio data based on the audio information to generate audio content associated with the first media device; and
   transmitting the audio content from the device to a second media device.

2. The method of claim 1, wherein the video is generated by an imaging system that utilizes ambient lighting.

3. The method of claim 1, wherein the video is generated by an imaging system that projects light on the object.

4. The method of claim 1, wherein the device includes a network device.

5. The method of claim 1, wherein the device includes a customer premises equipment device.

6. The method of claim 1, wherein filtering the audio data comprises cancelling the vibration data from the audio data.

7. The method of claim 1, wherein the audio data includes attribute data, the attribute data associated with the first media device, a location of the first media device, or both, and wherein the generation of the audio content is based on the attribute data.

8. The method of claim 1, wherein the video indicates amplitude of the vibrations of the object, phase of the vibrations of the object, frequency of the vibrations of the object, or a combination thereof.

9. An electronic device comprising:
   a processor; and
   a memory in communication with the processor, the memory including instructions executable by the processor to perform operations including:
   receiving, from a first media device, audio data and a video of an object;
   determining vibrations of the object from the video, the vibrations caused by sound in a vicinity of the object, wherein a portion of the vibrations is responsive to media content rendered at the first media device;
   accessing a database to retrieve vibration data associated with the media content rendered at the first media device;
   filtering the vibration data from the portion to generate vibration information;
   generating audio information based on the vibration information;
   filtering the audio data based on the audio information to generate audio content associated with the first media device; and
   transmitting the audio content to a second media device.

10. The electronic device of claim 9, wherein a second portion of the vibrations is due to vocal sound produced by a person in the vicinity of the object.

11. The electronic device of claim 10, wherein the vocal sound represents speech of the person in connection with a video meeting between the person and a second person associated with the second media device.

12. The electronic device of claim 11, wherein the operations further include:
   receiving video content from the first media device, the video content associated with the video meeting; and
   encoding the video content and the audio content into a message.

13. The electronic device of claim 12, wherein the audio content is transmitted to the second media device by sending the message to the second media device.

14. The electronic device of claim 9, wherein filtering the audio data comprises cancelling the vibration data from the audio data.

15. A computer-readable storage device comprising instructions executable by a processor to perform operations including:
- receiving, from a first media device, audio data and a video of an object;
- determining vibrations of the object from the video, the vibrations caused by sound in a vicinity of the object, wherein a portion of the vibrations is responsive to media content rendered at the first media device;
- accessing a database to retrieve vibration data associated with the media content rendered at the first media device;
- filtering the vibration data from the portion to generate vibration information;
- generating audio information based on the vibration information;
- filtering the audio data based on the audio information to generate audio content associated with the first media device; and
- sending the audio content to a second media device.

16. The computer-readable storage device of claim 15, wherein the video indicates amplitude of the vibrations, phase of the vibrations, frequency of the vibrations, or a combination thereof.

17. The computer-readable storage device of claim 15, wherein the audio data includes attribute data, the attribute data associated with the first media device, a location of the first media device, or both, and wherein the generation of the audio content is based on the attribute data.

18. The computer-readable storage device of claim 15, wherein a second portion of the audio content represents speech of a person in connection with a video meeting between the person and a second person.

19. The computer-readable storage device of claim 18, wherein the operations further include:
- receiving video content from the first media device, the video content associated with the video meeting; and
- encoding the video content and the audio content into a message.

20. The computer-readable storage device of claim 19, wherein the audio content is transmitted to the second media device by sending the message to the second media device.

* * * * *